US005175214A

United States Patent [19]

Takaya et al.

[11] Patent Number: 5,175,214

[45] Date of Patent: Dec. 29, 1992

[54] PRESSURE-SENSITIVE CONDUCTIVE ELASTOMER COMPOUND

[75] Inventors: Mitsuo Takaya; Kiyotaka Inoue; Katsumi Higuchi, all of Nara, Japan

[73] Assignee: Nitta Industries Corporation, Osaka, Japan

[21] Appl. No.: 799,863

[22] Filed: Nov. 27, 1991

Related U.S. Application Data

[63] Continuation of Ser. No. 519,320, May 4, 1990, abandoned, which is a continuation of Ser. No. 720,389, Jul. 18, 1988, abandoned, which is a continuation of Ser. No. 906,759, Sep. 11, 1986, abandoned.

[30] Foreign Application Priority Data

Nov. 11, 1985 [JP] Japan ............................... 60-253525

[51] Int. Cl.[5] ...................... C08L 61/10; C08L 83/04; C08L 75/04; C08L 25/10; H01B 1/20

[52] U.S. Cl. .................................. 525/104; 525/106; 525/129; 525/130; 525/183; 525/227; 525/233; 525/474; 525/480; 252/500; 252/511; 528/481

[58] Field of Search ............... 525/106, 474, 104, 480; 252/500, 511; 528/481

[56] References Cited

U.S. PATENT DOCUMENTS

| | | | |
|---|---|---|---|
| 2,697,028 | 12/1954 | Baker et al. | 528/481 |
| 4,273,697 | 6/1981 | Sumimura et al. | |
| 4,279,783 | 7/1981 | Kehrer et al. | 428/368 |
| 4,302,361 | 11/1981 | Kotani et al. | 252/511 |
| 4,495,236 | 1/1985 | Obara et al. | 252/500 |
| 4,497,728 | 2/1985 | Yoshimura et al. | 528/481 |
| 4,615,960 | 10/1986 | Yata | 252/500 |

FOREIGN PATENT DOCUMENTS

| | | | |
|---|---|---|---|
| 2450856 | 10/1980 | France . | |
| 2537984 | 6/1984 | France . | |
| 0106856 | 6/1985 | Japan | 525/106 |

OTHER PUBLICATIONS

Chem. Abst. 95:134191h (Carbon fibers in conductive rubber moldings) vol. 95 (1981).

*Primary Examiner*—James J. Seidleck
*Assistant Examiner*—Vasu S. Jagannathan
*Attorney, Agent, or Firm*—Koda and Androlia

[57] ABSTRACT

The invention relates to a pressure-sensitive conductive elastomer compound which exhibits high resistance (insulating performance) when it is in non-pressed condition and the resistance of which, as the compound is pressed, varies according to the magnitude of the pressure. The compound comprises a matrix material having insulating and elastomeric properties and baked and carbonized conductive spherical particles of a macromolecular material incorporated and dispersed into the matrix material. The conductivity of the conductive particles varies according to the degree of their carbonization.

9 Claims, 1 Drawing Sheet

PRESSURE-SENSITIVE CONDUCTIVE ELASTOMER COMPOUND

This is a continuation of application Ser. No. 519,320, filed May 4, 1990, now abandoned, which is a continuation of application Ser. No. 220,389, filed Jul. 18, 1988, now abandoned, which is a continuation of application Ser. No. 906,759, filed Sep. 11, 1986, now abandoned.

BACKGROUND OF THE INVENTION

This invention relates to pressure-sensitive conductive elastomer compounds and, more specifically, to a pressure-sensitive conductive elastomer compound of the type which exhibits high resistance (insulating performance) when it is in non-pressed condition, and of which the resistance, as the compound is pressed, will vary according to the magnitude of the pressure.

Hitherto, pressure-conductive materials have been known which are in the form of a conductive compound comprising a resilient material, such as rubber or the like, and a conductive filler mixed therewith. For such filler, metallic particles, such as nickel, conductive carbon black, graphite particles and the like are normally used. Such conductive compound, molded into a rod or sheet form, is widely used today as a switching element, or as a pressure-sensitive element for sensors such as pressure sensor and tactile sensor.

Conductive compounds of such conventional type have the following difficulties. Those incorporating metallic particles as a conductive filler are liable to change of properties with time due to oxidation of the particles; therefore, they lack stability and are often subject to chattering and noise generation. Those incorporating powdery masses of a conductive carbon black as a conductive filler provide only insignificant change in resistance when they are under pressure, because the particle diameter of the carbon black is extremely small, i.e., $20\sim30$ mμ; as such, they are of no practical use. If a granulated material formed of a conductive carbon black is used as such a filler, it is possible to provide greater variations in resistance, but a conductive compound incorporating such material is liable to particle breakage when it is under pressure; naturally, therefore, such compound lacks both durability and stability.

Where graphite particles are used as a conductive filler, no characteristic stability can be provided if they are of non-uniform shape as those of natural graphite. Therefore, it is known to use artificial graphite particles which have been rounded and freed of sharpness by pulverization, milling or otherwise to provide good characteristic stability.

Conductive compounds incorporating artificial graphite particles of such type are advantageous in that they are characteristically stable, durable, and less liable to noise generation, but on the other hand they have drawbacks in that preparation of graphite particles to the desired configuration requires a complicated and troublesome procedure and in that the attainable yield thereof is rather small.

SUMMARY OF THE INVENTION

This invention, made in view of aforesaid difficulties with the prior-art compounds, has as its primary object the provision of a pressure-sensitive conductive elastomer compound having highly stable conductive characteristics under pressure and which is easy to manufacture.

Another object of the invention is to provide a pressure-sensitive conductive elastomer compound whose conductive characteristics under pressure may be varied without changing the mechanical properties of the compound.

In order to accomplish the above and other objects, the compound according to the invention comprises a matrix material having insulating and elastomeric properties, and conductive particles of a macromolecular material having a spherical particle configuration and baked and carbonized, the conductive particles being incorporated and dispersed into the matrix material.

Materials available for use as aforesaid matrix material having insulating and elastomeric properties include natural rubber, synthetic rubbers, such as chloroprene rubber, SBR, NBR, and silicone rubber, thermoplastic elastomers, such as polyurethane, polyester, and EVA, and liquid rubbers, such as polyurethane and silicone. Particularly preferable among them is silicone rubber, a material having high heat resistance, excellent electrical properties, and good resistance to chemicals.

Macromolecular materials having a spherical particle configuration useful for the purpose of the invention include styrene, vinyl-chloride, vinylidene-chloride, methyl methacrylate, and furfuryl alcohol, all in spherical particle form prepared by suspension polymerization, and resol resins chemically pulverized in spherical particle form. The term "suspension polymerization" referred to herein means a process such that a polymerization catalyst is added to monomers, the mixture being stirred in water added with a dispersant to allow the monomers to disperse in oil-drop form, being then polymerized. The term "chemically pulverized" herein means that a resin dissolved in a solvent is cooled or added with a precipitant so that the resin is separated out in fine powder form.

The particle diameter of said conductive particles is $30\sim120$ μm, preferably $50\sim100$ μm, and the proportion of the particles to the compound as a whole is $20\sim60\%$ by volume. If the particle diameter is less than 30 μm, the possible variation in resistance of the compound is unreasonably small, while if it is greater than 120 μm, the particles cannot satisfactorily be dispersed in the matrix material. The proportion of the particles may be suitably determined according to the desired characteristics and sensitivity, and also to the type of the matrix material.

However, if it is less than 20% by volume, the compound may not exhibit any sufficient conductivity, and if it is more than 60% by volume, the variation in conductivity (resistance) when the compound is under pressure, from the conductivity level when the compound is not under pressure, is insignificant, the compound being thus of no practical use. Therefore, the proportion of the particles should be within the range of 20 vol. % to 60 vol. %.

According to the invention, spherical particles of a macromolecular material have conductivity given to them by being baked and wholy or partially carbonized. This facilitates the selection of particle size for the conductive particles. Therefore, it is possible to use particles having a uniform particle size, and thus to allow the compound to have highly stable pressure-sensitive conductive properties. Furthermore, the compound is easy to manufacture.

The degree of carbonization of the particles (thickness of the carbonized portion of each particle's spherical shell) can be varied by changing the degree of baking of the particles, and thus various conductivity grades of particles can be easily produced. Therefore, it is possible to provide varied pressure-sensitive conductive characteristics without changing the mechanical properties of the compound.

BRIEF DESCRIPTION OF THE DRAWINGS

In FIG. 1*a*, only the surface area of a particle is carbonized. In FIG. 1*b*, nearly the entire portion of a particle is carbonized. In FIG. 1*c*, a particle is entirely carbonized.

DETAILED DESCRIPTION OF THE INVENTION

The compound according to the invention will now be described in detail with reference to the accompanying drawings.

Figures 1A, 1B, 1C:
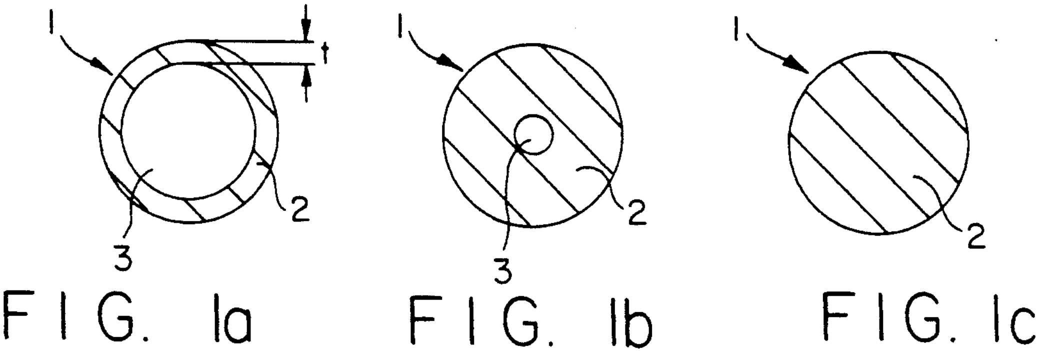
FIGS. 1*a* to 1*c*, inclusive, are sectional illustrations showing various degrees of carbonization of spherical particles of a macromolecular material.

FIGS. 1*a* through 1*c* are schematic views showing a few examples of spherical carbonized particles used for the purpose of the invention. Various conductivity grades of particles are shown as they are formed of non-conductive spherical particles of a macromolecular material. Experiments have revealed that the electric conductivity of the particles varies according to the heating and baking conditions. This is considered to be attributable to the following facts. If, as in FIG. 1*a*, only a region in the vicinity of the outer periphery of a particle 1 is carbonized thicknesswise (t) in a spherical shell pattern, the conductivity of the particle 1 is small because the carbonized portion 2, i.e., the portion having electric conductivity, is of a small volume. If carbonization progresses further to the extent that a larger part of the particle 1 is carbonized, as FIG. 1*b* shows, the conductivity of the particle 1 becomes considerably greater. Finally, if carbonization progresses still further until the particle is completely carbonized, the conductivity of the particle is maximized. Thus, even if particles 1 of same diameter are used, the carbonization degree of the particles varies according to the baking conditions applied. These facts are considered to be responsible for the variations in conductivity. Shown by 3 is a non-carbonized portion.

The degree of carbonization of particle 1 is adjustable by changes in baking conditions, such as heating temperature and time. Therefore, by baking and carbonizing preselected particles 1 having a specified diameter under preset baking conditions it is possible to easily obtain particles 1 having the required conductivity.

Particular examples are given hereinbelow to further illustrate the invention.

EXAMPLE 1

Spherical fine particles of a polystyrene resin material cross-linked with divinylbenzene and having a particle diameter of about 70～130 μm were heated to 300° C. in an air current, then heated and baked to 1000° C. in an inert gas. The particle diameter measurements of the carbonized particles thus obtained showed that more than 90 wt. % of the particles prior to baking were within the range of 53～105 μm. One hundred parts by weight of the carbonized particles within this range were mixed with 100 parts by weight of a silicone rubber (TSE 270 - 4 U, produced by Toshiba Silicone Co.), the mixture being kneaded, and one form of the pressure-sensitive conductive elastomer compound according to the invention was thus produced.

Figure 2:
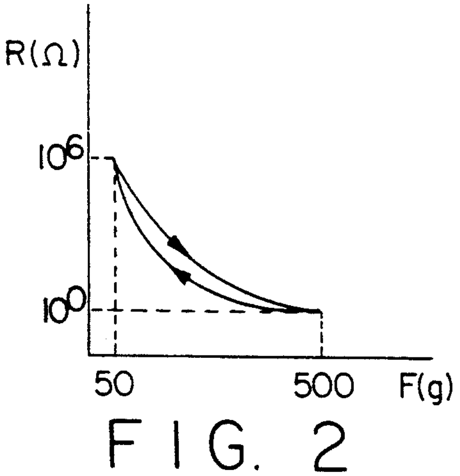
FIG. 2 is a graph showing the pressing force-resistance relationships in Example 1.

The compound was molded by press-molding into a sheet form having a thickness of 0.5 mm. Pressure was applied to the sheet surface by a rod-like pressing electrode having a 5 mm diameter, and the relationships between the pressing force and the resistance were measured. The measurements, as shown in FIG. 2, revealed satisfactory resistance variation characteristics, with only a small degree of hysterisis.

In this example, the spherical fine particles of polystyrene resin were produced in the following way. Benzoyl peroxide or lauroyl peroxide was dissolved in a mixed monomer liquid of styrene and divinylbenzene, and the resulting liquid was vigorously agitated in water added with a dispersant such as completely-saponified polyvinylalcohol, non-completely-saponified polyvinylalcohol or the like, being then suspension-polymerized at 80° C. for 6～8 hours.

EXAMPLE 2

A phenolic resin having a spheric particle configuration and a particle diameter of 60～100 μm was heated and baked at 800° C. in an inert gas. The particle diameters of the carbonized spherical particles in glass-like (amorphous) form thus obtained were such that more than 90 wt. % of the particles prior to baking were within the range of 44～74 μm. One hundred parts by weight of the carbonized particles within this range were mixed with 100 parts by weight of same silicone rubber as in Example 1, the mixture being kneaded together, then molded by press molding into a sheet having a thickness of 0.5 mm.

Figure 3:
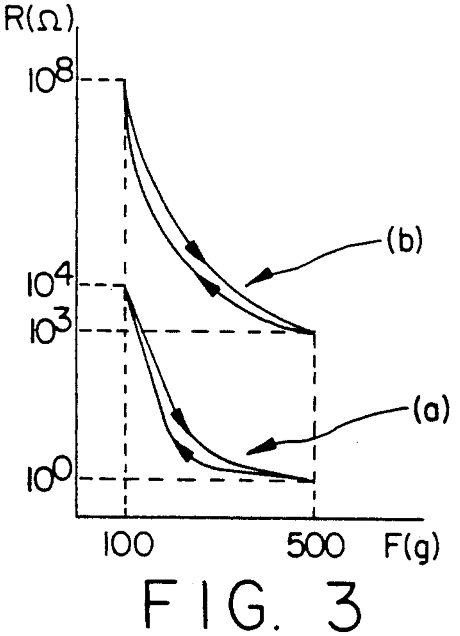
FIG. 3 is a graph showing the pressing force-resistance relationships in Examples 2 and 3, in which graph the character (a) represents such relationships in Example 2 and (b) represents those in Example 3.

Pressing force-resistance characteristics were measured in same way as in Example 1. The measurements, as shown in FIG. 3 graph (a), revealed that the sheet had good characteristics, with a small degree of hysterisis.

In this example, the spherical phenolic resin particles were produced in the following way: a resol resin was dissolved in acetone, and a precipitant was added to the mixture under stirring, so that spherical fine resin particles were separated out; the particles were then subjected to filtration and drying and subsequently heated and hardened.

In this conjunction, spherical phenolic resin particles were also produced in the following way: phenol was added into a large amount of an aqueous mixture solution of hydrochloric acid and formaldehyde under stirring, whereby a solid matter having a spherical configuration was produced; the solid matter was separated out, then neutralized in an alkaline solution, and subsequently washed in water and dried. Use of the phenolic resin particles thus obtained also witnessed satisfactory results as in aforesaid case.

EXAMPLE 3

Spherical phenolic resin particles identical with those used in Example 2 were heated and baked at 600 ° C. The particle diameters of the glass-like spherical carbonized particles were such that more than 90 wt. % of the particles prior to baking were within the diameter range of 44～74 μm. One hundred and twenty parts by weight of the carbonized particles within this range were mixed with 100 parts by weight of same silicone rubber as in Example 1, the mixture being kneaded together, and a 0.5 mm thick sheet was produced by press-molding.

Measurements were made in same way as in Example 1. The results are shown in FIG. 3 graph (b). In this instance, the variations in resistance shown are of a similar pattern to those in Example 2 except that the range of variations is different. This means that the conductivity of the spherical phenolic resin particles varies according to the baking temperature for the particles. Presumably, this may be due to the fact that the degree of carbonization varies according to the baking temperature and that as the baking temperature becomes higher, the carbonized portion will become greater. In other words, it is considered that the thickness t of the carbonized spherical shell portion in FIG. 1*a* becomes greater and thus the conductivity of the particle is increased.

What is claimed is:

1. A method of manufacturing a pressure-sensitive electrically conductive elastomer compound whose electrical conductivity varies with pressure applied to said elastomer compound comprising the steps of:

forming electrically conductive spherical particles by the steps of:

chemically pulverizing or suspension polymerizing a macromolecular material into spherical particles of 30–120 microns in diameter; and baking said spherical particles in an inert gas to at least partially carbonize said particles at a temperature from 600°-1000° C.; and mixing said conductive particles into a matrix material having insulating and elastomeric properties, the proportion of said conductive particles relative to the entire compound being in the range of 20 to 60% by volume.

2. A method for making a pressure sensitive electrically conductive elastomer according to claim 1, wherein a diameter of said spherical conductive particles is between 50 and 100 microns.

3. A method of manufacturing a pressure-sensitive electrically conductive elastomer compound according to claim 1, wherein said spherical particles of said macromolecular material are spherical particles of polystyrene resin which is formed by adding a polymerization catalyst to a styrene monomer and stirring the mixture in water with a dispersant added thereto to allow the monomers to disperse into an oil-drop and then polymerized.

4. A method of manufacturing a pressure-sensitive electrically conductive elastomer compound according to claim 1, wherein said spherical particles of said macromolecular material are spherical particles of phenol resin which are formed by dissolving resol resin in acetone and stirring the acetone and adding a precipitant thereto such that resin is separated therefrom.

5. A method of manufacturing a pressure-sensitive electrically conductive elastomer compound according to claim 1 wherein the diameter of said spherical conductive particles is 50–100 microns.

6. A pressure-sensitive electrically conductive elastomer compound whose electrical conductivity varies with pressure applied to the elastomer compound comprising a matrix material having insulating and elastomeric properties and conductive particles incorporated and dispersed into the matrix material, said conductive particles being formed by chemically pulverizing or suspension polymerizing a macromolecular material into spherical particles and thereafter baking and carbonizing said spherical particles at a temperature from 600°-1000° C., the diameter of said conductive particles being 30–120 microns and the proportion of said conductive particles relative to the entire compound being 20–60% by volume.

7. A pressure-sensitive electrically conductive elastomer compound according to claim 6, wherein said spherical particles of said macromolecular material are spherical particles of polystyrene resin which is formed by adding a polymerization catalyst to a styrene monomer and such mixture is stirred in water added with a dispersion to allow the monomers to disperse in oil-drop form and then polymerized.

8. A pressure-sensitive electrically conductive elastomer compound according to claim 6, wherein said spherical particles of said macromolecular material are spherical particles of phenol resin which is formed by dissolving resol resin in acetone and the acetone is stirred and a precipitant is added thereto so that resin is separated therefrom.

9. A pressure-sensitive electrically conductive elastomer compound according to claim 6, wherein the diameter of spherical conductive particles is between 50 and 100 microns.

* * * * *